United States Patent
Lim et al.

(10) Patent No.: US 9,210,019 B2
(45) Date of Patent: Dec. 8, 2015

(54) APPARATUS AND METHOD FOR TRANSMITTING PREAMBLE IN A WIRELESS COMMUNICATION SYSTEM

(75) Inventors: Chi-Woo Lim, Suwon-si (KR); Sung-Eun Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 793 days.

(21) Appl. No.: 12/821,722

(22) Filed: Jun. 23, 2010

(65) Prior Publication Data

US 2010/0329186 A1   Dec. 30, 2010

(30) Foreign Application Priority Data

Jun. 26, 2009 (KR) .................. 10-2009-0057927
Jul. 31, 2009 (KR) .................. 10-2009-0070662
Dec. 18, 2009 (KR) .................. 10-2009-0126858

(51) Int. Cl.
 *H04W 4/00* (2009.01)
 *H04L 27/26* (2006.01)
 *H04L 5/00* (2006.01)

(52) U.S. Cl.
 CPC ............. *H04L 27/262* (2013.01); *H04L 5/0053* (2013.01)

(58) Field of Classification Search
 USPC ........................................................ 370/328
 See application file for complete search history.

(56) References Cited

U.S. PATENT DOCUMENTS

| | | |
|---|---|---|
| 2003/0058972 A1 | 3/2003 | Iochi |
| 2003/0119452 A1 | 6/2003 | Kim et al. |
| 2005/0225447 A1 | 10/2005 | Diorio et al. |
| 2005/0249140 A1 | 11/2005 | Lee et al. |
| 2006/0056528 A1* | 3/2006 | Jung et al. ............ 375/260 |
| 2009/0046702 A1 | 2/2009 | Luo et al. |
| 2009/0122886 A1 | 5/2009 | Oketani et al. |
| 2009/0268604 A1* | 10/2009 | Yun et al. ............ 370/210 |
| 2010/0226322 A1* | 9/2010 | Choi et al. ............ 370/329 |
| 2011/0007719 A1* | 1/2011 | Lee ............ 370/336 |
| 2012/0177145 A1 | 7/2012 | Han et al. |

FOREIGN PATENT DOCUMENTS

| | | |
|---|---|---|
| CN | 101346916 A | 1/2009 |
| CN | 101420261 A | 4/2009 |
| JP | 2010-537497 A | 12/2010 |
| JP | 2012-503407 A | 2/2012 |

(Continued)

OTHER PUBLICATIONS

Sung-Eun Park et al., Proposed Text of Advanced Preamble for the IEEE 802.16m Amendment, IEEE C80216m-09/0958r3, May 6, 2009, pp. 1-30, URL, http://www.ieee802.org116/tgm/contrib/C80216m-09_0958r3.doc.

*Primary Examiner* — Rhonda Murphy
(74) *Attorney, Agent, or Firm* — Jefferson IP Law, LLP

(57) ABSTRACT

An apparatus and method for reducing a Peak to Average Power Ratio (PAPR) of a Secondary Advanced (SA) preamble in a wireless communication system are provided. A method for transmitting an SA preamble includes determining an SA preamble, constructed in a unit of subblocks, according to a frequency band to be used for transmitting information, determining a sequence for reducing a PAPR of the SA preamble in consideration of at least one of a frequency band, a segment IDentifier (ID), and the number of antennas transmitting the SA preamble, updating the SA preamble using the determined sequence, and transmitting the updated SA preamble to a receive end.

19 Claims, 4 Drawing Sheets

(56) References Cited

FOREIGN PATENT DOCUMENTS

| JP | 2013-507819 | A | 3/2013 |
|---|---|---|---|
| RU | 2236757 | C2 | 9/2004 |
| RU | 2370894 | C2 | 10/2009 |
| WO | 03/065664 | A1 | 8/2003 |
| WO | 03/085664 | A2 | 10/2003 |
| WO | 2007/052397 | A1 | 5/2007 |
| WO | 2008/001293 | A2 | 1/2008 |
| WO | 2009/023670 | A2 | 2/2009 |

* cited by examiner

APPARATUS AND METHOD FOR TRANSMITTING PREAMBLE IN A WIRELESS COMMUNICATION SYSTEM

PRIORITY

This application claims the benefit under 35 U.S.C. §119 (a) of a Korean patent application filed in the Korean Intellectual Property Office on Jun. 26, 2009 and assigned Serial No. 10-2009-0057927, of a Korean patent application filed in the Korean Intellectual Property Office on Jul. 31, 2009 and assigned Serial No. 10-2009-0070662, and of a Korean patent application filed in the Korean Intellectual Property Office on Dec. 18, 2009 and assigned Serial No. 10-2009-0126858, the entire disclosures of all of which are hereby incorporated by reference.

BACKGROUND OF THE INVENTION

1. Field of the Invention

The present invention relates to a preamble of a wireless communication system. More particularly, the present invention relates to an apparatus and method for reducing a Peak to Average Power Ratio (PAPR) of a Secondary Advanced (SA) preamble for distinguishing a cell IDentifier (ID) in an Orthogonal Frequency Division Multiplexing (OFDM) wireless communication system.

2. Description of the Related Art

Many wireless communication technologies have been proposed as candidates to provide high speed mobile communication. Among these, the OFDM scheme is now recognized as a next-generation wireless communication technology. The OFDM scheme is a scheme of transmitting data using multiple carriers. However, in the case of using the OFDM scheme, there is a problem in that a transmit end has a high PAPR characteristic because it transmits one data stream through a plurality of subcarriers.

In the case of using the OFDM scheme, a Base Station (BS) transmits a synchronization channel for time synchronization and BS identification to a Mobile Station (MS). Here, the synchronization channel is called a preamble.

Through the synchronization channel received from the BS, the MS can acquire the time synchronization with the BS, and distinguish the BS to which the MS belongs. For example, the Institute of Electrical and Electronics Engineers (IEEE) 802.16m standard, which adopts the OFDM technology, makes use of a Primary Advanced (PA) preamble and an SA preamble. Here, the PA preamble is used for the time synchronization and the SA preamble is used for the BS identification.

In a case in which a BS transmits an SA preamble for time synchronization of the BS and BS identification as above, the BS converts a sequence constituting the preamble into an OFDM symbol and transmits the OFDM symbol. Thus, there is a problem that a PAPR of an SA preamble transmitted by the BS is high.

SUMMARY OF THE INVENTION

An aspect of the present invention is to address at least the above-mentioned problems and/or disadvantages and to provide at least the advantages described below. Accordingly, an aspect of the present invention is to provide an apparatus and method for reducing a Peak to Average Power Ratio (PAPR) of a Secondary Advanced (SA) preamble in a wireless communication system.

Another aspect of the present invention is to provide an apparatus and method for designing a Block Cover Sequence (BCS) for reducing a PAPR of an SA preamble in a wireless communication system.

Another aspect of the present invention is to provide an apparatus and method for designing a BCS for reducing a PAPR of an SA preamble in case of applying Tone Dropping (TD) in a wireless communication system.

The above aspects are addressed by providing an apparatus and method for transmitting a preamble in a wireless communication system.

In accordance with an aspect of the present invention, a method for transmitting an SA preamble in a wireless communication system is provided. The method includes determining an SA preamble, constructed in a unit of subblocks, according to a frequency band to be used for transmitting information, determining a sequence for reducing a PAPR of the SA preamble in consideration of at least one of a frequency band, a segment IDentifier (ID), and the number of antennas transmitting the SA preamble, updating the SA preamble using the determined sequence, and transmitting the updated SA preamble to a receive end.

In accordance with another aspect of the present invention, an apparatus for transmitting an SA preamble in a wireless communication system is provided. The apparatus includes a preamble generator, a sequence generator, a controller, and a transmitter. The preamble generator determines an SA preamble, constructed in a unit of subblocks, according to a frequency band to be used for transmitting information. The sequence generator determines a sequence for reducing a PAPR of the SA preamble in consideration of at least one of a frequency band, a segment ID, and the number of antennas transmitting the SA preamble. The controller updates the SA preamble using the determined sequence. The transmitter transmits the updated SA preamble to a receive end.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A technology for reducing a Peak to Average Power Ratio (PAPR) of a Secondary Advanced (SA) preamble in a wireless communication system, according to an exemplary embodiment of the present invention, is described below.

The following description is made on the assumption that a wireless communication system uses the Institute of Electrical and Electronics Engineers (IEEE) 802.16m standard, but an exemplary embodiment of the present invention is identically applicable to other wireless communication systems employing Orthogonal Frequency Division Multiplexing (OFDM).

The following description is made on the assumption that a wireless communication system uses a 512-size Fast Fourier Transform (FFT) in a case in which a frequency band of 5 MHz is used, uses a 1024-size FFT in a case in which a frequency band of 10 MHz is used, and uses a 2048-size FFT in a case in which a frequency band of 20 MHz is used. Thus, in the following description, an FFT size corresponds to a certain frequency band.

The following description, the frequency band and a channel bandwidth are used in the same meaning.

Figure 1:
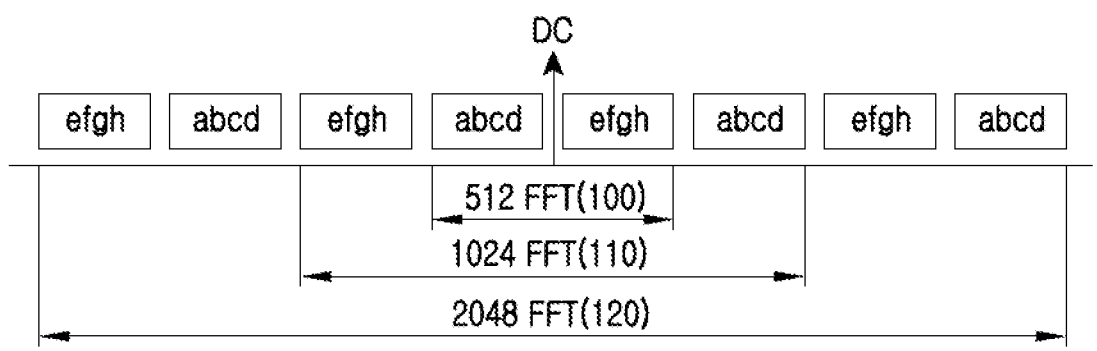
FIG. 1 is a diagram illustrating a construction of a Secondary Advanced (SA) preamble in a wireless communication system according to an exemplary embodiment of the present invention.

FIG. 1 is a diagram illustrating a construction of an SA preamble in a wireless communication system according to an exemplary embodiment of the present invention.

Referring to FIG. 1, in a case in which an FFT size is '512', an SA preamble 100 is composed of 8 subblocks (a, b, c, d, e, f, g, and h). Here, each subblock is comprised of a binary sequence or a quaternary sequence. For example, in a case in which each subblock is comprised of a binary sequence may have a length of '18'. For another example, in a case in which each subblock is comprised of a quaternary sequence, the subblock may be comprised of modulated symbols, which are obtained by modulating a binary sequence in a Quadrature Phase Shift Keying (QPSK) modulation scheme.

In a case in which an FFT size is extended, an SA preamble to be used in the extended-size FFT is constructed by iterating the 8 subblocks of SA preamble 100. That is, in a case in which a frequency band is extended, an SA preamble to be used at the extended frequency band is constructed by iterating the subblocks of the SA preamble 100 used at 5 MHz. For example, in a case in which the FFT size is extended to '1024', an SA preamble 110 is constructed by a single iteration of the 8 subblocks of the SA preamble 100 used in the 512-FFT size. For another example, in a case in which the FFT size is extended to '2048', an SA preamble 120 is constructed by iterating the 8 subblocks of the SA preamble 100 used in the 512-FFT size three times.

As aforementioned, an SA preamble is constructed by iterating subblocks. In this case, a transmit end designs a Block Cover Sequence (BCS) for reducing a Peak to Average Power Ratio (PAPR) of an SA preamble whose subblocks are iterated, and applies the designed BCS to the SA preamble. In an exemplary embodiment, each bit of the BCS is applied to each subblock constituting the SA preamble. Thus, in a case in which an SA preamble having a 5 MHz bandwidth is composed of 8 subblocks, a BCS is composed of 8 bits. And, in a case in which an SA preamble having a 10 MHz bandwidth is composed of 16 subblocks, a BCS is composed of 16 bits. In a case in which an SA preamble of a 20 MHz bandwidth is composed of 32 subblocks, a BCS is composed of 32 bits.

In consideration of an FFT size, a segment IDentifier (ID), and the number of antennas transmitting an SA preamble, the BCS is designed as shown in Table 1 below.

TABLE 1

| FFT, number | Segment ID | | |
|---|---|---|---|
| of antennas | 0 | 1 | 2 |
| (512, 1) | 00 | 00 | 00 |
| (512, 2) | 22 | 22 | 37 |
| (512, 4) | 09 | 01 | 07 |
| (512, 8) | 00 | 00 | 00 |
| (1024, 1) | 0FFF | 555A | 000F |
| (1024, 2) | 7373 | 3030 | 0000 |
| (1024, 4) | 3333 | 2D2D | 2727 |
| (1024, 8) | 0F0F | 0404 | 0606 |
| (2048, 1) | 08691485 | 1E862658 | 4D901481 |
| (2048, 2) | 7F55AA42 | 4216CC47 | 3A5A26D9 |
| (2048, 4) | 6F73730E | 1F30305A | 77000013 |
| (2048, 8) | 2F333319 | 0B2D2D03 | 0127271F |

Table 1 shows a hexadecimal representation for the BCS. For example, in a case in which the FFT size is '512', the segment ID is '0', and an SA preamble is transmitted using one antenna, a BCS for the SA preamble is '00' in hexadecimal representation. Here, the hexadecimal '00' can also be expressed as a binary '00000000'. At this time, a transmit end applies each bit of the BCS to each subblock constituting the SA preamble. For example, a first bit '0' of the BCS is applied to a subblock 'a' constituting the SA preamble used in the 512-size FFT, a second bit '0' is applied to a subblock 'b', a third bit '0' is applied to a subblock 'c', and so on such that the transmit end sequentially applies each bit of the BCS to each subblock constituting the SA preamble.

In a case in which the subblock is comprised of the binary sequence, the transmit end converts '0' among a sequence value of each subblock constituting the SA preamble and a bit value of the BCS into '1', and converts the '1' into '−1'. After that, the transmit end multiplies the converted sequence value of each subblock constituting the SA preamble by the converted bit value of the BCS of the SA preamble to update the SA preamble, reducing a PAPR of the SA preamble.

On the other hand, in a case in which the subblock is comprised of the quaternary sequence, the transmit end may apply each bit of the BCS of the SA preamble to each subblock constituting the SA preamble to update the SA preamble, reducing a PAPR of the SA preamble.

By using Tone Dropping (TD), a wireless communication system can maintain the same subcarrier interval at a different frequency band.

Generally, an FFT size increases two fold. That is, the FFT size increases from '512' to '1024', and increases from '1024' to '2048'.

Thus, the wireless communication system is able to maintain the same subcarrier interval using a 512-size FFT and a frequency band of 5 MHz as when using a 1024-size FFT and a frequency band of 10 MHz.

However, in a case of using a frequency band of 8.75 MHz, the transmit end cannot transmit information at the 8.75 MHz band using the 1024-FFT size in the same subcarrier interval as when using the 5 MHz or 10 MHz band. But, through a TD scheme, the transmit end can transmit the information at the 8.75 MHz band using the same subcarrier interval as when using the 5 MHz or 10 MHz band. For example, because the transmit end using the frequency band of 8.75 MHz transmits information only for the 8.75 MHz band excepting other bands at 10 MHz, the transmit end can have the same subcarrier interval as when using the 10 MHz band. That is, by mapping information only to a part corresponding to the frequency band of 8.75 MHz among an FFT used for information transmission, the transmit end can have the same subcarrier interval as when using the 10 MHz band.

As described above, in a case in which the TD is used, the transmit end can make use of the SA preamble constructed in FIG. 1 above, for the sake of BS identification. For example, in a case in which the used frequency band is equal to or greater than 5 MHz and is less than 10 MHz, the transmit end makes use of the SA preamble 100 having the 512-FFT size. 1. Also, in a case in which the used frequency band is equal to or greater than 10 MHz and is less than 20 MHz, the transmit end makes use of the SA preamble 110 having the 1024-FFT size. In this case, the transmit end may make use of the BCS designed in Table 1 above in order to reduce a PAPR of the SA preamble 110.

For another example, in a case in which the TD is used, the transmit end may make use of an SA preamble constructed in FIG. 2 below.

Figure 2:
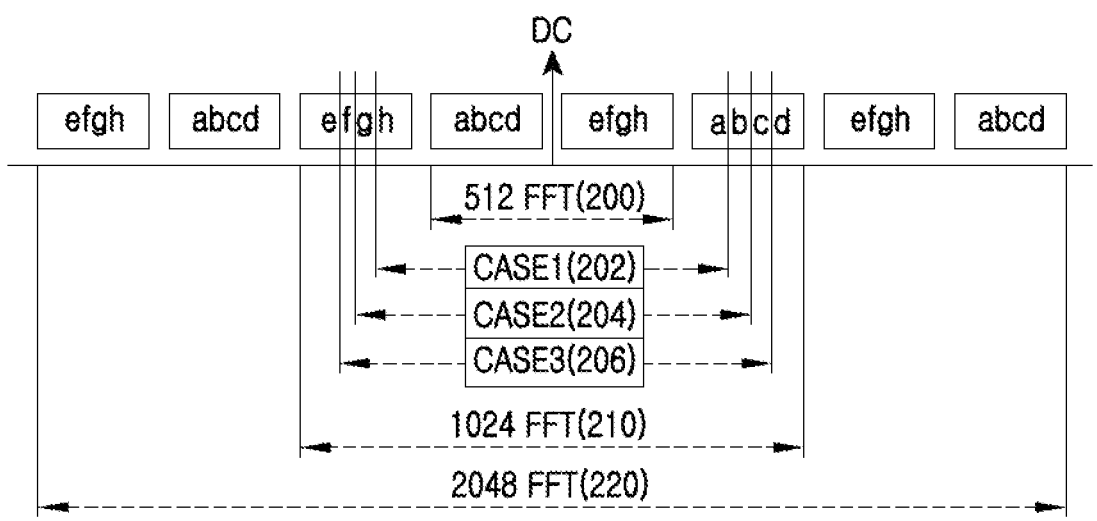
FIG. 2 is a diagram illustrating a construction of an SA preamble in a case in which Tone Dropping (TD) is used in a wireless communication system according to an exemplary embodiment of the present invention.

FIG. 2 is a diagram illustrating a construction of an SA preamble in a case in which TD is used in a wireless communication system according to an exemplary embodiment of the present invention.

Referring to FIG. 2, in a case in which an FFT size is '512', an SA preamble 200 is composed of 8 subblocks (a, b, c, d, e, f, g, and h). Here, each subblock is comprised of a binary sequence or a quaternary sequence. For example, in a case in which each subblock is comprised of a binary sequence, the binary sequence may have a length of '18'. For another example, in a case in which each subblock is comprised of a quaternary sequence, the subblock may be composed of modulated symbols, which are obtained by modulating a binary sequence in a QPSK modulation scheme.

In a case of using a frequency band greater than 5 MHz and less than 10 MHz through TD, an SA preamble sequences for the tone dropping support are obtained by dropping the farthest sub-blocks of a second SA preamble 210 form Direct Current (DC) subcarrier on both sides. Here, the second SA preamble 210 used in a 1024-FFT size. However, an SA preamble having a frequency band applying the TD can be either expressed in the format of extending an SA preamble of a low-reference frequency band in a unit of subblock or in the format of dropping an SA preamble of a high-reference frequency band in a unit of subblock. In more detail, an SA preamble for a frequency band greater than 5 MHz and less than 10 MHz using TD can be either expressed in the format of extending both ends centering around the DC in a unit of subblock in the first SA preamble 200 used in a 512-FFT size or in the format of dropping the farthest sub-blocks of both ends centering around the DC in the second SA preamble 210. In the following description, an expression is made with reference to the format of extending in a unit of subblock on the basis of the first SA preamble 200 but is the same as the expression of the format of dropping in a unit of subblock on the basis of the second SA preamble 210. For example, in a case in which a frequency band is greater than 5 MHz and is equal to or less than 6.25 MHz, an SA preamble 202 is constructed by adding one subblock to each of both ends of the first SA preamble 200. For another example, in a case in which the frequency band is greater than 6.25 MHz and is equal to or less than 7.5 MHz, an SA preamble 204 is constructed by adding two subblocks to each of both ends of the first SA preambles 200. For yet another example, in a case in which the frequency band is greater than 7.5 MHz and is less than 10 MHz, an SA preamble 206 is constructed by adding three subblocks to each of both ends of the first SA preamble 200.

In a case in which the FFT size is '1024', the second SA preamble 210 is constructed by iterating the 8 subblocks constituting the first SA preamble 200 one time.

In a case of using a frequency band greater than 10 MHz and less than 20 MHz through TD, the SA preamble sequences for the tone dropping support are obtained by dropping the farthest sub-blocks of a third SA preamble 220 form the DC subcarrier on both sides. Here, the third SA preamble 220 used in a 2048-FFT size. In the following description, an expression is made of extending in a unit of subblock on the basis of the second SA preamble 210 but is the same as the expression of dropping in a unit of subblock on the basis of the third SA preamble 220. For example, in a case in which a frequency band is greater than 10 MHz and is equal to or less than 11.25 MHz, the SA preamble is constructed by adding one subblock to each of both ends of the second SA preamble 210.

In a case in which the FFT size is '2048', the third SA preamble 220 is constructed by iterating the 8 subblocks constituting the first SA preamble 200 three times.

In the aforementioned exemplary embodiment of the present invention, in a case in which TD is used, an SA preamble is constructed by extending in a unit of two subblocks and therefore, a frequency band is extended in a unit of 1.25 MHz. Thus, frequency bands having a unit of 1.25 MHz make use of the same SA preamble. In more detail, in a case in which a frequency band of 7 MHz is used, a frequency band greater than 6.25 MHz and equal to or less than 7.5 MHz makes use of the same SA preamble 204 as the frequency band of 7 MHz.

As described above, in a case in which TD is used, an SA preamble is dropped in a unit of subblock. At this time, the SA preamble can be represented in the format of extending in a unit of subblock on the basis of a low-reference SA preamble. In this case, a transmit end designs a BCS for reducing a PAPR of the SA preamble, and applies the designed BCS to the SA preamble. That is, the transmit end applies each bit of the BCS to each subblock constituting the SA preamble. Thus, in a case in which TD is used, the BCS is designed by extending in a unit of two subblocks. For example, in a case in which a BCS for the SA preamble 200 of the frequency band of MHz is composed of 8 bits, a BCS for the SA preamble 202 used in the frequency band greater than 5 MHz and equal to or less than 6.25 MHz is composed of 10 bits. Also, a BCS of the SA preamble 204 used in the frequency band greater than 6.25 MHz and equal to or less than 7.5 MHz is composed of 12 bits. And, a BCS of the SA preamble 206 used in the frequency band greater than 7.5 MHz and less than 10 MHz is composed of 14 bits.

As described above, in a case in which TD is used, a BCS can be composed of 10 bits, 12 bits, or 14 bits depending on a used frequency band. But, as shown in Table 2 below, the BCS is expressed by 16 bits. Thus, the BCS is set to a binary value of '0' for the remaining bits excepting the bits (e.g., 10 bits, 12 bits, or 14 bits) constituting the BCS itself depending on the used frequency band.

For another example, in a case in which TD is used at a frequency band of less than 20 MHz, a BCS is extended and composed of 18 bits, 20 bits, 22 bits, 24 bits, 26 bits, 28 bits, or 30 bits in the same method as described above. But, as shown in Table 2 below, the BCS is expressed by 32 bits. Thus, the BCS is set to a binary value of '0' for the remaining bits excepting the bits (e.g., 18 bits, 20 bits, 22 bits, 24 bits, 26 bits, 28 bits, or 30 bits) constituting the BCS itself depending on the used frequency band.

In a case in which TD is used, in consideration of a Band-Width (BW), a segment ID, and the number of antennas transmitting an SA preamble, the BCS is designed as shown in Table 2 below.

TABLE 2

| $BW_{min}$, number of antennas | Segment ID | | |
|---|---|---|---|
| | 0 | 1 | 2 |
| (5, 1) | 00 | 00 | 00 |
| (5, 2) | 33 | 25 | 40 |
| (5, 4) | 14 | 40 | 51 |
| (5, 8) | 00 | 00 | 00 |
| (6.25, 1) | 0AA0 | 0FF8 | 0008 |
| (6.25, 2) | 0F68 | 0650 | 0458 |
| (6.25, 4) | 0300 | 0300 | 0908 |
| (6.25, 8) | 0140 | 0000 | 0100 |
| (7.5, 1) | 000C | 1008 | 0990 |
| (7.5, 2) | 0C24 | 1558 | 0F58 |
| (7.5, 4) | 1B08 | 030C | 1904 |
| (7.5, 8) | 0140 | 0400 | 0510 |
| (8.75, 1) | 0C10 | 229A | 2554 |
| (8.75, 2) | 335A | 146C | 3C10 |
| (8.75, 4) | 1320 | 0252 | 2406 |
| (8.75, 8) | 0140 | 0404 | 1514 |
| (10, 1) | 0FFF | 555A | 000F |
| (10, 2) | 7373 | 3030 | 0000 |
| (10, 4) | 2323 | 5252 | 0404 |
| (10, 8) | 4141 | 0404 | 1515 |
| (11.25, 1) | F7FDCEF3 | 29D51936 | 6B59CC03 |
| (11.25, 2) | 005A0F80 | 00000000 | 00000000 |
| (11.25, 4) | 00AF6A80 | 00E65280 | 00A45900 |
| (11.25, 8) | 00230000 | 00A30200 | 00090800 |
| (12.5, 1) | AC1AD967 | 602F7D20 | 96771160 |
| (12.5, 2) | 000F7000 | 01FF0000 | 00000040 |
| (12.5, 4) | 00AF6A80 | 00E65040 | 00C45900 |
| (12.5, 8) | 015B0940 | 00030C40 | 01190540 |
| (13.75, 1) | 4F56FD74 | C0F7EEAD | 55459EDB |
| (13.75, 2) | 012C1BA0 | 030177A0 | 02266200 |
| (13.75, 4) | 024C2400 | 03155920 | 01CF59A0 |
| (13.75, 8) | 009B0800 | 02830D20 | 02190420 |
| (15, 1) | DAD99B4F | 96771160 | CCF40660 |
| (15, 2) | 00CC5AB0 | 015411D0 | 020E0050 |
| (15, 4) | 038C2470 | 02D559C0 | 048F58D0 |

TABLE 2-continued

| $BW_{min}$, number of antennas | Segment ID | | |
|---|---|---|---|
| | 0 | 1 | 2 |
| (15, 8) | 009B0820 | 02830D10 | 06190420 |
| (16.25, 1) | 492F4A63 | 3785F431 | AFCB95FD |
| (16.25, 2) | 065A5AD0 | 06543808 | 080F4C50 |
| (16.25, 4) | 0D335A70 | 01146C70 | 053C10D8 |
| (16.25, 8) | 09932018 | 0D025248 | 00240640 |
| (17.5, 1) | DD37B03D | 81418C78 | A47BAAA9 |
| (17.5, 2) | 10C36614 | 1B553644 | 0F9A5524 |
| (17.5, 4) | 19B35A4C | 13146C44 | 03BC1030 |
| (17.5, 8) | 1223234C | 09525248 | 1B04042C |
| (18.75, 1) | 56849127 | 7EBE7387 | 4B958D3A |
| (18.75, 2) | 2BA55AD4 | 029C6D58 | 13590072 |
| (18.75, 4) | 3D73734C | 0F30306C | 2B00000E |
| (18.75, 8) | 05232312 | 21525272 | 04040414 |

Table 2 shows a hexadecimal representation of the BCS. For example, in a case in which the used BW is 6.25 MHz, the segment ID is '0', and an SA preamble is transmitted using one antenna, a BCS of the SA preamble is '0AA0' in hexadecimal representation. Here, the hexadecimal '0AA0' can be represented as a binary '0000 1010 1010 0000'.

In the aforementioned exemplary embodiment, a transmit end applies a newly designed BCS to an SA preamble extended by means of TD.

In accordance with another exemplary embodiment of the present invention, a transmit end can selectively use a BCS from the BCS designed in Table 2 above, according to a BW transmitting an SA preamble or the number of subblocks used for data transmission. For example, in a case in which a used frequency band is 10 MHz but a BW transmitting an SA preamble is 6.25 MHz, the transmit end can make use of a BCS for 6.25 MHz. For another example, in a case in which the used frequency band is 10 MHz but the number of subblocks of a transmitted SA preamble is the same as the number of subblocks corresponding to 6.25 MHz, the transmit end can make use of a BCS for 6.25 MHz.

The following description is made of an exemplary method for lowering a PAPR of an SA preamble by means of a BCS and transmitting the SA preamble in a transmit end.

Figure 3:
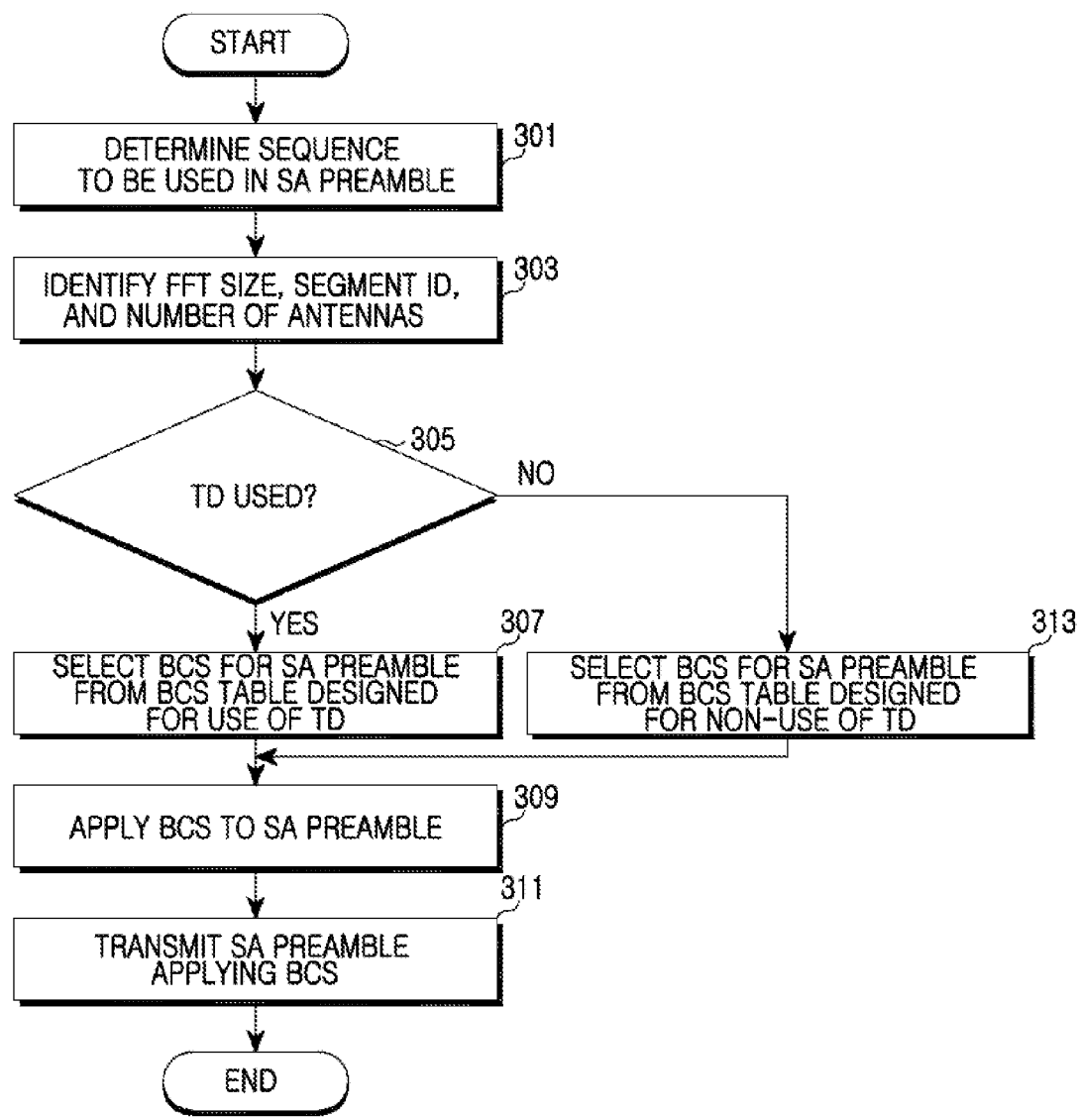
FIG. 3 is a flowchart illustrating a procedure for transmitting an SA preamble in a wireless communication system according to an exemplary embodiment of the present invention.

FIG. 3 is a flowchart illustrating a procedure for transmitting an SA preamble in a wireless communication system according to an exemplary embodiment of the present invention.

Referring to FIG. 3, in step 301, the transmit end determines a sequence of an SA preamble according to a frequency band to be used for transmitting information. For example, as illustrated in FIG. 1, the transmit end iterates subblocks constituting an SA preamble of a 5 MHz band to generate an SA preamble of a corresponding frequency band. For another example, as illustrated in FIG. 2, the transmit end obtains SA preamble sequences for the tone dropping support by dropping the farthest sub-blocks of the reference bandwidth form the DC subcarrier on both sides.

After determining the sequence of the SA preamble, the transmit end proceeds to step 303 and identifies an FFT size, a segment ID, and the number of antennas transmitting the SA preamble. Here, the FFT size corresponds to a certain frequency band.

After that, the transmit end proceeds to step 305 and determines if TD has been used.

In a case in which TD has been used, the transmit end proceeds to step 307 and selects a BCS for reducing a PAPR of an SA preamble from the BCS table constructed in Table 2 above, in consideration of an FFT size, a segment ID, and the number of antennas transmitting the SA preamble.

On the other hand, in a case in which TD has not been used, the transmit end proceeds to step 313 and selects a BCS for reducing a PAPR of an SA preamble from the BCS table constructed in Table 1 above, in consideration of an FFT size, a segment ID, and the number of antennas transmitting the SA preamble.

After selecting the BCS for the SA preamble, the transmit end proceeds to step 309 and applies each bit constituting the BCS to each subblock constituting the SA preamble. For example, if it is assumed that, a frequency band is 5 MHz, the segment ID is '0', and the SA preamble transmitted using one antenna is composed of 8 subblocks (a, b, c, d, e, f, g, and h), the BCS has a binary value of '11011110'. At this time, the transmit end sequentially applies each bit of the BCS to each subblock constituting the SA preamble. That is, the transmit end applies a first bit '1' of the BCS to a subblock 'a' constituting the SA preamble, applies a second bit '1' to a subblock 'b', applies a third bit '0' to a subblock 'c', and so on.

After applying the BCS to the SA preamble, the transmit end proceeds to step 311 and transmits the SA preamble applying the BCS to a receive end.

After that, the transmit end terminates the procedure according to the exemplary embodiment of the present invention.

In the aforementioned exemplary embodiment of the present invention, a transmit end selects a BCS for reducing a PAPR of an SA preamble, in consideration of an FFT size, a segment ID, and the number of antennas transmitting the SA preamble.

In accordance with another exemplary embodiment of the present invention, a transmit end may select a BCS for reducing a PAPR of an SA preamble, in consideration of a BW transmitting the SA preamble, a segment ID, and the number of antennas transmitting the SA preamble.

In accordance with a yet another exemplary embodiment of the present invention, a transmit end may select a BCS for reducing a PAPR of an SA preamble, in consideration of the number of subblocks of a transmitted SA preamble, a segment ID, and the number of antennas transmitting the SA preamble.

In the case of applying each bit of a BCS to each subblock constituting an SA preamble as above, a transmit end converts '0' among a sequence value of each subblock constituting the SA preamble and a bit value of the BCS into '1', and converts the '1' into '−1'. After that, the transmit end multiplies the converted sequence value of each subblock of the SA preamble by the converted bit value of the BCS of the SA preamble to update the SA preamble, reducing a PAPR of the SA preamble.

The following description is made of an exemplary transmit end for lowering a PAPR of an SA preamble by means of a BCS and transmitting the SA preamble.

Figure 4:
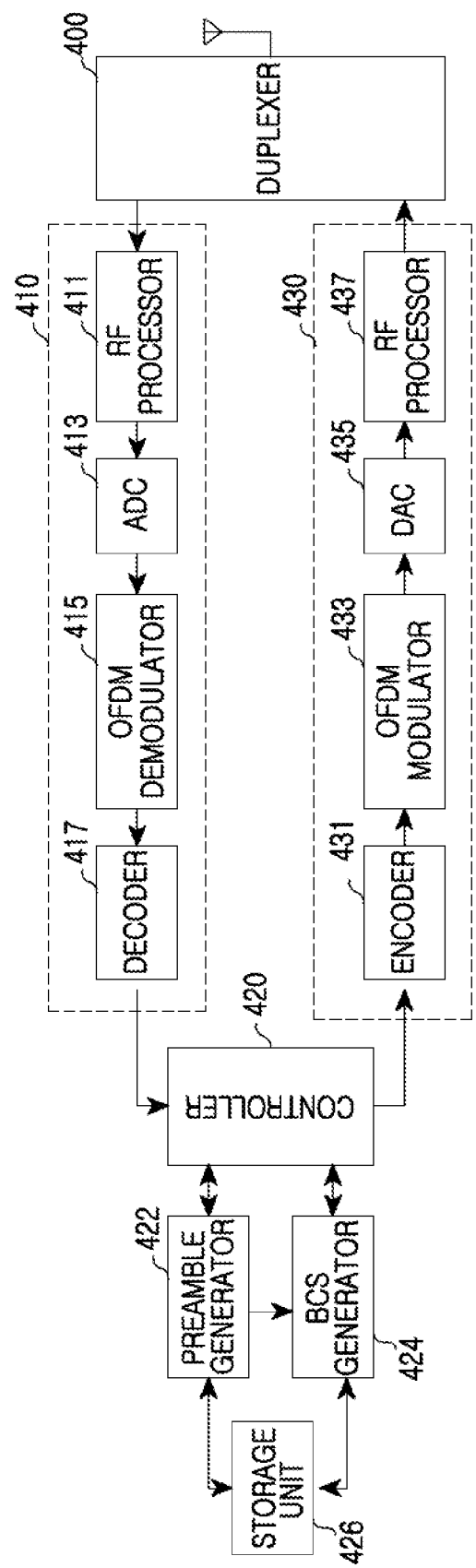
FIG. 4 is a block diagram illustrating a construction of a transmit end for transmitting an SA preamble according to an exemplary embodiment of the present invention.

FIG. 4 is a block diagram illustrating a construction of a transmit end for transmitting an SA preamble according to an exemplary embodiment of the present invention.

Referring to FIG. 4, the transmit end includes a duplexer 400, a receiver 410, a controller 420, and a transmitter 430.

According to a duplexing scheme, the duplexer 400 transmits a transmit signal provided from the transmitter 430 through an antenna, and provides a receive signal from the antenna to the receiver 410.

The receiver 410 includes a Radio Frequency (RF) processor 411, an Analog to Digital Converter (ADC) 413, an OFDM demodulator 415, and a decoder 417.

The RF processor 411 converts an RF signal provided from the duplexer 400 into a baseband analog signal. The ADC 413 converts the analog signal provided from the RF processor 411 into digital sample data.

The OFDM demodulator 415 converts time domain sample data provided from the ADC 413 into frequency domain data through Fourier Transform (FT). For example, the OFDM demodulator 415 converts time domain sample data into frequency domain data through Fast Fourier Transform (FFT).

The decoder 417 demodulates and decodes a signal provided from the OFDM demodulator 415 according to a modulation level (i.e., a Modulation and Coding Scheme (MCS) level).

The controller 420 controls a general operation of the transmit end and controls information transmission. For example, the controller 420 controls to apply a BCS provided from a BCS generator 424, to an SA preamble provided from a preamble generator 422. In an exemplary implementation, the controller 420 applies each bit constituting the BCS to each subblock constituting the SA preamble. For example, it is assumed that, in a case in which a frequency band is 5 MHz, a segment ID is '0', and an SA preamble transmitted using one antenna is composed of 8 subblocks (a, b, c, d, e, f, g, and h), the BCS has a binary value of '00000000'. At this time, the controller 420 sequentially applies each bit of the BCS to each subblock constituting the SA preamble, like applying a first bit '0' of the BCS to a subblock 'a' constituting the SA preamble, applying a second bit '0' to a subblock 'b', and applying a third bit '0' to a subblock 'c'.

In a case in which the controller 420 applies each bit of the BCS to each subblock constituting the SA preamble, the controller 420 converts '0' among a sequence value of each subblock constituting the SA preamble and a bit value of the BCS into '1', and converts the '1' into '−1'. After that, the controller 420 multiplies the converted sequence value of each subblock of the SA preamble by the converted bit value of the BCS of the SA preamble to update the SA preamble, reducing a PAPR of the SA preamble.

The preamble generator 422 generates a PA preamble for time synchronization with a receive end and an SA preamble for its own identification. For example, as illustrated in FIG. 1, the preamble generator 422 iterates subblocks constituting an SA preamble of a 5 MHz band to generate an SA preamble of a corresponding frequency band. For another example, as illustrated in FIG. 2, the preamble generator 422 generates SA preamble sequences for the tone dropping support by dropping the farthest sub-blocks of the reference bandwidth. At this time, the preamble generator 422 receives subblock information constituting the SA preamble from the storage unit 426. Here, an FFT size corresponds to a certain frequency band.

The BCS generator 424 selects a BCS for the SA preamble generated in the preamble generator 422 among BCSs included in a BCS table provided from the storage unit 426, in consideration of an FFT size, a segment ID, and the number of antennas transmitting the SA preamble. For example, in a case in which TD has not been used, the BCS generator 424 selects a BCS for reducing a PAPR of the SA preamble from a BCS table constructed in Table 1 above, in consideration of an FFT size, a segment ID, and the number of antennas transmitting the SA preamble. Here, the FFT size corresponds to a certain frequency band.

On the other hand, in a case in which the TD has been used, the BCS generator 424 selects a BCS for reducing a PAPR of the SA preamble from a BCS table constructed in Table 2 above, in consideration of an FFT size, a segment ID, and the number of antennas transmitting the SA preamble.

The storage unit 426 stores the subblock information for generating an SA preamble, and the BCS table.

The transmitter 430 includes an encoder 431, an OFDM modulator 433, a Digital to Analog Converter (DAC) 435, and an RF processor 437.

The encoder 431 encodes and modulates a transmit signal or control information according to a corresponding modulation level (i.e., an MCS level). For example, the encoder 431 encodes and modulates an SA preamble applying a BCS provided from the controller 420 according to a corresponding modulation level (i.e., an MCS level).

The OFDM modulator 433 converts frequency domain data provided from the encoder 431 into time domain sample data (i.e., OFDM symbols) through Inverse Fourier Transform (IFT). For example, the OFDM modulator 433 converts frequency domain data into time domain sample data (i.e., OFDM symbols) through Inverse Fast Fourier Transform (IFFT).

The DAC 435 converts the sample data provided from the OFDM modulator 433 into an analog signal. The RF processor 437 converts the baseband analog signal provided from the DAC 433 into an RF signal.

In the aforementioned exemplary embodiments, a wireless communication system can maintain the same subcarrier interval at a different frequency band by means of TD. At this time, an inverse number of the subcarrier interval represents a symbol duration and, therefore, the subcarrier interval may be represented by the symbol duration. That is, the wireless communication system can maintain the same symbol duration at a different frequency band by means of TD.

Also, in the aforementioned exemplary embodiments, the BCS generator 424 selects a BCS for an SA preamble generated in the preamble generator 422 among BCSs included in a BCS table provided from the storage unit 426, in consideration of an FFT size, a segment ID, and the number of antennas transmitting the SA preamble.

In accordance with an exemplary embodiment of the present invention, the BCS generator 424 may select a BCS for an SA preamble generated in the preamble generator 422 among BCSs included in a BCS table provided from the storage unit 426, in consideration of a BW transmitting the SA preamble, a segment ID, and the number of antennas transmitting the SA preamble.

In accordance with an exemplary embodiment of the present invention, the BCS generator 424 may select a BCS for an SA preamble generated in the preamble generator 422 among BCSs included in a BCS table provided from the storage unit 426, in consideration of the number of subblocks of a transmitted SA preamble, a segment ID, and the number of antennas transmitting the SA preamble.

As described above, exemplary embodiments of the present invention can advantageously reduce a PAPR of an SA preamble, by transmitting the SA preamble using a BCS designed to reduce the PAPR of the SA preamble in a wireless communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a Secondary Advanced (SA) preamble in a wireless communication system, the method comprising:

identifying an SA preamble;

identifying a block cover sequence based on a segment IDentifier (ID) and the number of antennas;

applying the identified block cover sequence to the SA preamble; and transmitting the SA preamble, wherein the identifying of the SA preamble comprises:

if tone dropping (TD) is supported, obtaining the SA preamble by dropping farthest sub-blocks of a reference bandwidth from a direct current (DC) subcarrier on both sides.

2. The method of claim 1, wherein the identifying of the SA preamble comprises:

repeating basic sub-blocks according to a Fast Fourier Transform (FFT) size; and identifying the SA preamble composed of the repeated basic sub-blocks.

3. The method of claim 2, wherein the repeating of the basic sub-blocks consists of a single repetition if the FFT size corresponding to a frequency bandwidth is expanded from 512-FFT size to 1024-FFT size and consists of three repetitions if the FFT size corresponding to the frequency bandwidth is expanded from 512-FFT size to 2048-FFT size.

4. The method of claim 1, wherein the identified SA preamble comprises at least one of an SA preamble of a 10 MHz band and an SA preamble of a 20 MHz band.

5. The method of claim 1, wherein the identifying of the block cover sequence comprises:

identifying the support or non-support of the TD;

selecting any one of at least two tables, which comprise block cover sequences, depending on the support or non-support of the TD; and selecting a block cover sequence from the selected table, in consideration of the segment ID and the number of antennas transmitting the identified SA preamble.

6. The method of claim 5, wherein, in a case that the TD is not supported, the selecting of the table comprises selecting the following table comprising block cover sequences denoted by a Fast Fourier Transform (FFT) size, the segment ID, and the number of antennas transmitting the identified SA preamble:

| FFT, number of antennas | Segment ID | | |
| --- | --- | --- | --- |
| | 0 | 1 | 2 |
| (512, 1) | 00 | 00 | 00 |
| (512, 2) | 22 | 22 | 37 |
| (512, 4) | 09 | 01 | 07 |
| (512, 8) | 00 | 00 | 00 |
| (1024, 1) | 0FFF | 555A | 000F |
| (1024, 2) | 7373 | 3030 | 0000 |
| (1024, 4) | 3333 | 2D2D | 2727 |
| (1024, 8) | 0F0F | 0404 | 0606 |
| (2048, 1) | 08691485 | 1E862658 | 4D901481 |
| (2048, 2) | 7F55AA42 | 4216CC47 | 3A5A26D9 |
| (2048, 4) | 6F73730E | 1F30305A | 77000013 |
| (2048, 8) | 2F333319 | 0B2D2D03 | 0127271F. |

7. The method of claim 5, wherein, in a case that the TD is supported, the selecting of the table comprises selecting the following table comprising block cover sequences denoted by a minimum value $BW_{min}$, the segment ID, and the number of antennas transmitting the identified SA preamble:

| $BW_{min}$, number | Segment ID | | |
|---|---|---|---|
| of antennas | 0 | 1 | 2 |
| (6.25, 1) | 0AA0 | 0FF8 | 0008 |
| (6.25, 2) | 0F68 | 0650 | 0458 |
| (6.25, 4) | 0300 | 0300 | 0908 |
| (6.25, 8) | 0140 | 0000 | 0100 |
| (7.5, 1) | 000C | 1008 | 0990 |
| (7.5, 2) | 0C24 | 1558 | 0F58 |
| (7.5, 4) | 1B08 | 030C | 1904 |
| (7.5, 8) | 0140 | 0400 | 0510 |
| (8.75, 1) | 0C10 | 229A | 2554 |
| (8.75, 2) | 335A | 146C | 3C10 |
| (8.75, 4) | 1320 | 0252 | 2406 |
| (8.75, 8) | 0140 | 0404 | 1514 |
| (11.25, 1) | F7FDCEF3 | 29D51936 | 6B59CC03 |
| (11.25, 2) | 005A0F80 | 00000000 | 00000000 |
| (11.25, 4) | 00AF6A80 | 00E65280 | 00A45900 |
| (11.25, 8) | 00230000 | 00A30200 | 00090800 |
| (12.5, 1) | AC1AD967 | 602F7D20 | 96771160 |
| (12.5, 2) | 000F7000 | 01FF0000 | 00000040 |
| (12.5, 4) | 00AF6A80 | 00E65040 | 00C45900 |
| (12.5, 8) | 015B0940 | 00030C40 | 01190540 |
| (13.75, 1) | 4F56FD74 | C0F7EEAD | 55459EDB |
| (13.75, 2) | 012C1BA0 | 030177A0 | 02266200 |
| (13.75, 4) | 024C2400 | 03155920 | 01CF59A0 |
| (13.75, 8) | 009B0800 | 02830D20 | 02190420 |
| (15, 1) | DAD99B4F | 96771160 | CCF40660 |
| (15, 2) | 00CC5AB0 | 015411D0 | 020E0050 |
| (15, 4) | 038C2470 | 02D559C0 | 048F58D0 |
| (15, 8) | 009B0820 | 02830D10 | 06190420 |
| (16.25, 1) | 492F4A63 | 3785F431 | AFCB95FD |
| (16.25, 2) | 065A5AD0 | 06543808 | 080F4C50 |
| (16.25, 4) | 0D335A70 | 01146C70 | 053C10D8 |
| (16.25, 8) | 09932018 | 0D025248 | 00240640 |
| (17.5, 1) | DD37B03D | 81418C78 | A47BAAA9 |
| (17.5, 2) | 10C36614 | 1B553644 | 0F9A5524 |
| (17.5, 4) | 19B35A4C | 13146C44 | 03BC1030 |
| (17.5, 8) | 1223234C | 09525248 | 1B04042C |
| (18.75, 1) | 56849127 | 7EBE7387 | 4B958D3A |
| (18.75, 2) | 2BA55AD4 | 029C6D58 | 13590072 |
| (18.75, 4) | 3D73734C | 0F30306C | 2B00000E |
| (18.75, 8) | 05232312 | 21525272 | 04040414. |

8. The method of claim 1, wherein the applying of the identified block sequence to the SA preamble comprises applying the identified block cover sequence to each sub-block constituting the identified SA preamble.

9. The method of claim 8, wherein the applying of the identified block cover sequence to the SA preamble comprises:
mapping each bit {0, 1} of the identified block cover sequence to real number {+1, −1}; and
multiplying the each bit of the identified block cover sequence to all the sub-carriers in the corresponding sub-block of the identified SA preamble.

10. An apparatus for transmitting a Secondary Advanced (SA) preamble in a wireless communication system, the apparatus comprising:
a controller configured to:
identify an SA preamble,
identify a block cover sequence based on a segment IDentifier (ID) and the number of antennas, and
apply the identified block cover sequence to the SA preamble; and
a transmitter configured to transmit the SA preamble, wherein the controller is further configured to:
identify the SA preamble, and
if tone dropping (TD) is supported, obtain the SA preamble by dropping farthest sub-blocks of a reference bandwidth from a direct current (DC) subcarrier on both sides.

11. The apparatus of claim 10, wherein the contoller is further configured to:
identify the SA preamble by repeating basic sub-blocks according to a Fast Fourier Transform (FFT) size, and
identify the SA preamble composed of the repeated basic sub-blocks.

12. The apparatus of claim 11, wherein the controller is further configured to:
repeat the basic sub-blocks a single time if the FFT size corresponding to a frequency bandwidth is expanded from 512-FFT size to 1024-FFT size, and
repeat the basic sub-blocks three times if the frequency bandwidth is expanded from 512-FFT size to 2048-FFT size.

13. The apparatus of claim 10, wherein in the case that the TD is supported, the controller is further configured to identify the SA preamble using at least one of an SA preamble of a 10 MHz band and an SA preamble of a 20 MHz band as the SA preamble of the reference bandwidth.

14. The apparatus of claim 10, wherein the controller is further configured to select a block cover sequence from any one table, which is selected depending on the support or non-support of the TD among at least two tables comprising block cover sequences in consideration of the segment ID and the number of antennas transmitting the identified SA preamble.

15. The apparatus of claim 14, wherein, in a case in which the TD is not supported, the controller is further configured to select a block cover sequence from the following table comprising block cover sequences denoted by a Fast Fourier Transform (FFT) size, the segment ID, and the number of antennas transmitting the identified SA preamble:

| FFT, number | Segment ID | | |
|---|---|---|---|
| of antennas | 0 | 1 | 2 |
| (512, 1) | 00 | 00 | 00 |
| (512, 2) | 22 | 22 | 37 |
| (512, 4) | 09 | 01 | 07 |
| (512, 8) | 00 | 00 | 00 |
| (1024, 1) | 0FFF | 555A | 000F |
| (1024, 2) | 7373 | 3030 | 0000 |
| (1024, 4) | 3333 | 2D2D | 2727 |
| (1024, 8) | 0F0F | 0404 | 0606 |
| (2048, 1) | 08691485 | 1E862658 | 4D901481 |
| (2048, 2) | 7F55AA42 | 4216CC47 | 3A5A26D9 |
| (2048, 4) | 6F73730E | 1F30305A | 77000013 |
| (2048, 8) | 2F333319 | 0B2D2D03 | 0127271F. |

16. The apparatus of claim 14, wherein, in a case in which the TD is supported, the controller is further configured to select a block cover sequence from the following table comprising block cover sequences denoted by a minimum value $BW_{min}$, the segment ID, and the number of antennas transmitting the identified SA preamble:

| $BW_{min}$, number | Segment ID | | |
|---|---|---|---|
| of antennas | 0 | 1 | 2 |
| (6.25, 1) | 0AA0 | 0FF8 | 0008 |
| (6.25, 2) | 0F68 | 0650 | 0458 |
| (6.25, 4) | 0300 | 0300 | 0908 |
| (6.25, 8) | 0140 | 0000 | 0100 |
| (7.5, 1) | 000C | 1008 | 0990 |
| (7.5, 2) | 0C24 | 1558 | 0F58 |
| (7.5, 4) | 1B08 | 030C | 1904 |
| (7.5, 8) | 0140 | 0400 | 0510 |

| BW$_{min}$, number of antennas | Segment ID 0 | Segment ID 1 | Segment ID 2 |
|---|---|---|---|
| (8.75, 1) | 0C10 | 229A | 2554 |
| (8.75, 2) | 335A | 146C | 3C10 |
| (8.75, 4) | 1320 | 0252 | 2406 |
| (8.75, 8) | 0140 | 0404 | 1514 |
| (11.25, 1) | F7FDCEF3 | 29D51936 | 6B59CC03 |
| (11.25, 2) | 005A0F80 | 00000000 | 00000000 |
| (11.25, 4) | 00AF6A80 | 00E65280 | 00A45900 |
| (11.25, 8) | 00230000 | 00A30200 | 00090800 |
| (12.5, 1) | AC1AD967 | 602F7D20 | 96771160 |
| (12.5, 2) | 000F7000 | 01FF0000 | 00000040 |
| (12.5, 4) | 00AF6A80 | 00E65040 | 00C45900 |
| (12.5, 8) | 015B0940 | 00030C40 | 01190540 |
| (13.75, 1) | 4F56FD74 | C0F7EEAD | 55459EDB |
| (13.75, 2) | 012C1BA0 | 030177A0 | 02266200 |
| (13.75, 4) | 024C2400 | 03155920 | 01CF59A0 |
| (13.75, 8) | 009B0800 | 02830D20 | 02190420 |
| (15, 1) | DAD99B4F | 96771160 | CCF40660 |
| (15, 2) | 00CC5AB0 | 015411D0 | 020E0050 |
| (15, 4) | 038C2470 | 02D559C0 | 048F58D0 |
| (15, 8) | 009B0820 | 02830D10 | 06190420 |
| (16.25, 1) | 492F4A63 | 3785F431 | AFCB95FD |
| (16.25, 2) | 065A5AD0 | 06543808 | 080F4C50 |
| (16.25, 4) | 0D335A70 | 01146C70 | 053C10D8 |
| (16.25, 8) | 09932018 | 0D025248 | 00240640 |
| (17.5, 1) | DD37B03D | 81418C78 | A47BAAA9 |
| (17.5, 2) | 10C36614 | 1B553644 | 0F9A5524 |
| (17.5, 4) | 19B35A4C | 13146C44 | 03BC1030 |
| (17.5, 8) | 1223234C | 09525248 | 1B04042C |
| (18.75, 1) | 56849127 | 7EBE7387 | 4B958D3A |
| (18.75, 2) | 2BA55AD4 | 029C6D58 | 13590072 |
| (18.75, 4) | 3D73734C | 0F30306C | 2B00000E |
| (18.75, 8) | 05232312 | 21525272 | 04040414. |

17. The apparatus of claim 10, wherein the controller is configured to apply the identified block cover sequence to each sub-block constituting the identified SA preamble.

18. The apparatus of claim 17, wherein the controller is further configured to:
   apply the identified block cover sequence to the SA preamble by mapping each bit {0, 1} of the identified block cover sequence to real number {+1, −1}, and
   multiply the each bit of the identified block cover sequence to all the sub-carriers in the corresponding sub-block of the identified SA preamble.

19. The apparatus of claim 10, further comprising a storage unit comprising information of at least two sub-blocks constituting an SA preamble and a table of a block cover sequence for reducing a PAPR of at least one SA preamble.

\* \* \* \* \*